(12) United States Patent
Ikura et al.

(10) Patent No.: US 12,195,614 B2
(45) Date of Patent: *Jan. 14, 2025

(54) CELLULOSE FIBER-REINFORCED POLYPROPYLENE RESIN FORMED BODY AND METHOD FOR PRODUCING THE SAME

(71) Applicant: FURUKAWA ELECTRIC CO., LTD., Tokyo (JP)

(72) Inventors: Yukihiro Ikura, Tokyo (JP); Mayu Satake, Tokyo (JP); Suzune Ito, Tokyo (JP); Yasuo Nakajima, Tokyo (JP); Kenichi Suyama, Tokyo (JP); Jae Kyung Kim, Tokyo (JP); Hiroki Tanaka, Tokyo (JP); Isao Tomomatsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 613 days.

This patent is subject to a terminal disclaimer.

(21) Appl. No.: 17/484,054

(22) Filed: Sep. 24, 2021

(65) Prior Publication Data

US 2022/0010113 A1    Jan. 13, 2022

Related U.S. Application Data

(63) Continuation of application No. PCT/JP2020/013854, filed on Mar. 26, 2020.

(30) Foreign Application Priority Data

Mar. 27, 2019   (JP) ................................ 2019-060607

(51) Int. Cl.
*C08L 23/06* (2006.01)
*B29C 48/00* (2019.01)
(Continued)

(52) U.S. Cl.
CPC .......... *C08L 23/12* (2013.01); *B29C 48/0011* (2019.02); *B29C 48/022* (2019.02);
(Continued)

(58) Field of Classification Search
CPC .. C08L 1/02; C08L 23/12; C08L 23/14; C08L 23/06; C08K 7/02
See application file for complete search history.

(56) References Cited

U.S. PATENT DOCUMENTS 4,212,543 A     7/1980  Bersano
11,905,399 B2 *  2/2024  Ikura .......................... C08F 8/46
(Continued)

FOREIGN PATENT DOCUMENTS

CN       108834420 A    11/2018
EP       3 950 823 A1    2/2022
(Continued)

OTHER PUBLICATIONS

Japanese Office Action dated Nov. 14, 2023 for corresponding Application No. 2021-509618 with an English translation.
(Continued)

*Primary Examiner* — Rip A Lee
(74) *Attorney, Agent, or Firm* — Birch, Stewart, Kolasch & Birch, LLP (57) ABSTRACT

A cellulose fiber-reinforced polypropylene resin formed body that is a resin formed body having respective diffraction peaks observed at positions of a scattering vector s of $1.61\pm0.1$ nm$^{-1}$, $1.92\pm0.1$ nm$^{-1}$, and $3.86\pm0.1$ nm$^{-1}$ in a wide-angle X-ray diffraction measurement, and is characterized by having $\Delta T$ calculated by the following formula (1) of $40.0°$ C. or more; and a cellulose fiber-reinforced polypropylene resin formed body that is a resin formed body having the above diffraction peaks and is characterized by having $\Delta T_m$ and $\Delta T_c$ expressed by the following formulae (2) and (3) and satisfying $\Delta T_m < \Delta T_c$; and a producing method of these.

(Continued)

$$\Delta T = T_{m(PP\ Cell)} - T_{c(PP\ Cell)} \quad (1)$$

$$\Delta T_m = T_{m(PP)} - T_{m(PP\ Cell)} \quad (2)$$

$$\Delta T_c = T_{c(PP)} - T_{c(PP\ Cell)} \quad (3)$$

8 Claims, 1 Drawing Sheet

(51) Int. Cl.
- *B29C 48/40* (2019.01)
- *C08K 7/00* (2006.01)
- *C08K 7/02* (2006.01)
- *C08L 1/02* (2006.01)
- *C08L 23/12* (2006.01)
- *B29K 23/00* (2006.01)
- *B29K 201/00* (2006.01)

(52) U.S. Cl.
CPC ............... *B29C 48/40* (2019.02); *C08K 7/02* (2013.01); *C08L 1/02* (2013.01); *B29K 2023/12* (2013.01); *B29K 2201/00* (2013.01)

(56) References Cited

U.S. PATENT DOCUMENTS

| | | |
|---|---|---|
| 2012/0190775 A1 | 7/2012 | Yasuda et al. |
| 2014/0315009 A1 | 10/2014 | Noda et al. |
| 2019/0023882 A1 | 1/2019 | Kim et al. |
| 2020/0190299 A1 | 6/2020 | Hiroishi et al. |
| 2020/0190305 A1 | 6/2020 | Sawada et al. |
| 2022/0025133 A1* | 1/2022 | Ikura ..................... C08L 23/10 |

FOREIGN PATENT DOCUMENTS

| | | |
|---|---|---|
| JP | 10-329190 A | 12/1998 |
| JP | 4013870 B2 | 11/2007 |
| JP | 4127316 B2 | 7/2008 |
| JP | 2011-190322 A | 9/2011 |
| JP | 2011-219571 A | 11/2011 |
| JP | 5762674 B2 | 8/2015 |
| WO | WO 2013/094563 A1 | 6/2013 |
| WO | WO 2019/039570 A1 | 2/2019 |
| WO | WO 2019/039571 A1 | 2/2019 |

OTHER PUBLICATIONS

International Search Report (PCT/ISA/210) issued in PCT/JP2020/013854, dated Jun. 23, 2020.
Notice of Reasons for Refusal issued in Japanese Application No. 2019-060607, dated Aug. 27, 2019.
Rejection Assessment issued in Japanese Application No. 2019-060607, dated Mar. 10, 2020.
Extended European Search Report for corresponding European Application No. 20778826.6, dated Nov. 9, 2022.
Chinese Office Action and Search Report for corresponding Chinese Application No. 202080005580.7, dated Nov. 14, 2022, with English translation.

* cited by examiner

CELLULOSE FIBER-REINFORCED POLYPROPYLENE RESIN FORMED BODY AND METHOD FOR PRODUCING THE SAME

CROSS-REFERENCE TO RELATED APPLICATIONS

This application is a Continuation of PCT International Application No. PCT/JP2020/013854 filed on Mar. 26, 2020, which claims priority under 35 U.S.C. § 119 (a) to Japanese Patent Application No. 2019-060607 filed in Japan on Mar. 27, 2019. Each of the above applications is hereby expressly incorporated by reference, in its entirely, into the present application.

TECHNICAL FIELD

The present invention relates to a cellulose fiber-reinforced polypropylene resin formed body and a method for producing the same.

BACKGROUND ART

There has been known a fiber-reinforced resin compounding a reinforcing fiber, such as a glass fiber and an organic fiber, in a resin in order to enhance a mechanical physical property of a polyolefin resin, such as polyethylene and polypropylene. The organic fibers include cellulose fibers, for example, kraft pulp fiber, wood flour, and jute fiber. It has been known that using an organic fiber as a reinforcement material causes the obtained fiber-reinforced resin to be lighter in weight and to have a higher specific strength (value obtained by dividing a mechanical strength by a density) compared with the case of reinforcement with a glass fiber.

For example, Patent Literature 1 discloses a composite resin composition including a polypropylene resin and plant fibers having organic solvent extractable components of 1 weight % or less.

As a fiber-reinforced resin produced by reinforcing a resin other than the above-described polyolefin resin with an organic fiber, for example, Patent Literatures 2 and 3 disclose a biodegradable aliphatic polyester composition that includes pulp and/or cellulose fiber whose outer layers of a primary wall and a secondary wall are scratched and an aliphatic polyester.

CITATION LIST

Patent Literatures

Patent Literature 1: Japanese Patent No. 5762674
Patent Literature 2: Japanese Patent No. 4013870
Patent Literature 3: Japanese Patent No. 4127316

SUMMARY OF INVENTION

Technical Problem

A material used in a transport equipment material and the like is requested to have a sufficient elongation property at room temperature and at high temperature in terms of an impact resistance and workability. Recently, this request has been further increased.

After examining the conventional plant fiber-reinforced polypropylene resin compositions, including the technique disclosed in Patent Literature 1, the inventors have come to find that formed bodies of these plant fiber-reinforced polypropylene resin compositions do not have the elongation property sufficient to satisfy the above-described request.

The present invention has an object to provide a cellulose fiber-reinforced polypropylene resin formed body excellent in elongation property at room temperature and at high temperature. Additionally, the present invention has an object to provide a method for producing a cellulose fiber-reinforced polypropylene resin formed body having the above-described excellent property.

Solution to Problem

As a result of further research on physical properties of a fiber-reinforced polypropylene resin formed body including an organic fiber and a polypropylene resin, the inventors have found that the elongation property at room temperature and at high temperature was able to be sufficiently enhanced by using a cellulose fiber as the organic fiber and adjusting a crystallization temperature and a melting point to a form that satisfies a specific relation. The present invention is completed based on these findings.

That is, the above-described problem of the present invention was solved by the following means.

<1>

A cellulose fiber-reinforced polypropylene resin formed body, which is a resin formed body having respective diffraction peaks observed at positions of a scattering vector s of $1.61\pm0.1$ nm$^{-1}$, $1.92\pm0.1$ nm$^{-1}$, and $3.86\pm0.1$ nm$^{-1}$ in a wide-angle X-ray diffraction measurement, and is characterized by having $\Delta T$ calculated by the following formula of $40.0°$ C. or more:

$$\Delta T = T_{m(PP\ Cell)} - T_{c(PP\ Cell)} \quad (1)$$

in the above-described formula, $T_{m(PP\ Cell)}$ and $T_{c(PP\ Cell)}$, in this order, indicate a melting point and a crystallization temperature, respectively, of the above-described cellulose fiber-reinforced polypropylene resin formed body.

<2>

A cellulose fiber-reinforced polypropylene resin formed body, which is a resin formed body having respective diffraction peaks observed at positions of a scattering vector s of $1.61\pm0.1$ nm$^{-1}$, $1.92\pm0.1$ nm$^{-1}$, and $3.86\pm0.1$ nm$^{-1}$ in a wide-angle X-ray diffraction measurement, and is characterized by having $\Delta T_m$ and $\Delta T_c$ expressed by the following formulae (2) and (3) and satisfying $\Delta T_m < \Delta T_c$:

$$\Delta T_m = T_{m(PP)} - T_{m(PP\ Cell)} \quad (2)$$

$$\Delta T_c = T_{c(PP)} - T_{c(PP\ Cell)} \quad (3)$$

in the above-described formulae, $T_{m(PP)}$ indicates a melting point of the above-described polypropylene resin, $T_{m(PP\ Cell)}$ indicates a melting point of the above-described cellulose fiber-reinforced polypropylene resin formed body, $T_{c(PP)}$ indicates a crystallization temperature of the above-described polypropylene resin, and $T_{c(PP\ Cell)}$ indicates a crystallization temperature of the above-described cellulose fiber-reinforced polypropylene resin formed body.

<3>

The cellulose fiber-reinforced polypropylene resin formed body according to <1> or <2>, wherein a component having the diffraction peak at the position of the scattering vector s of $3.86\pm0.1$ nm$^{-1}$ has an orientation degree of more than 0.15 and less than 0.80.

<4>

The cellulose fiber-reinforced polypropylene resin formed body according to any one of <1> to <3>, wherein an elongation at break at 100° C. is more than 700%.

<5>
A method for producing the cellulose fiber-reinforced polypropylene resin formed body according to any one of <1> to <4>,
wherein the method uses a twin-screw extruder,
wherein the twin-screw extruder includes screws having a compression structure with two or more stages that at least includes a first compression portion and a second compression portion,
wherein the method includes a step of adding water or maleic anhydride as a hydrophilic compound or a solution of the hydrophilic compound to a melt-kneaded product of a polypropylene resin and a cellulose fiber, at any positions from the first compression portion to the second compression portion of the screws, and conducting kneading under a pressure condition exceeding a saturated vapor pressure of the additive.

In the description of the present invention, "to" is used to mean that values described before and after "to" are included as the lower limit value and the upper limit value.

Effects of Invention

The cellulose fiber-reinforced polypropylene resin formed body of the present invention is excellent in elongation property at room temperature and at high temperature. With the method for producing the cellulose fiber-reinforced polypropylene resin formed body of the present invention, the cellulose fiber-reinforced polypropylene resin formed body having the above-described excellent property can be obtained.

BRIEF DESCRIPTION OF THE DRAWINGS

FIG. 1 is a one-dimensional diffraction pattern of a wide-angle X-ray diffraction measurement of a cellulose fiber-reinforced polypropylene resin formed body according to Example 1-1. A diffraction peak observed at a position of a scattering vector s of 1.59 nm$^{-1}$ is a diffraction peak derived from a polypropylene α-crystal (040) plane, and a diffraction peak observed at a position of the scattering vector s of 1.90 nm$^{-1}$ is a diffraction peak derived from a polypropylene α-crystal (110) plane. Note that a diffraction peak observed at a position of the scattering vector s of 2.08 nm$^{-1}$ is a diffraction peak derived from a polypropylene α-crystal (130) plane, and a diffraction peak observed at a position of the scattering vector s of 2.45 nm$^{-1}$ is a composite diffraction peak of a plurality of diffraction planes including a polypropylene α-crystal (111) plane.

DESCRIPTION OF EMBODIMENTS

{Resin Formed Body}

A cellulose fiber-reinforced polypropylene resin formed body (hereinafter simply referred to also as a "resin formed body") of the present invention has respective diffraction peaks at positions of a scattering vector s of 1.61±0.1 nm$^{-1}$, 1.92±0.1 nm$^{-1}$, and 3.86±0.1 nm$^{-1}$ observed in a wide-angle X-ray diffraction measurement. The diffraction peaks at the positions of the scattering vector s of 1.61±0.1 nm$^{-1}$ and 1.92±0.1 nm$^{-1}$ are diffraction peaks derived from a polypropylene α-type crystal (hereinafter also referred to as a "polypropylene α-crystal") (040) plane, and the diffraction peak at the position of 3.86±0.1 nm$^{-1}$ is a diffraction peak derived from a cellulose Iβ type crystal (004) plane in the cellulose fiber.

That is, the resin formed body of the present invention is a fiber-reinforced polypropylene resin formed body including a polypropylene resin and a cellulose fiber, and at least a part of polypropylene forms an α-crystal.

In one aspect of the resin formed body of the present invention, ΔT expressed in the following formula (1) is 40.0° C. or more in the above-described resin formed body.

$$\Delta T = T_{m(PP\ Cell)} - T_{c(PP\ Cell)} \quad (1)$$

In the above-described formula, $T_{m(PP\ Cell)}$ and $T_{c(PP\ Cell)}$, in this order, indicate a melting point and a crystallization temperature, respectively, of the above-described cellulose fiber-reinforced polypropylene resin formed body.

The upper limit value of the above-described ΔT is not specifically limited, but 60.0° C. or less is practical.

The resin formed body of the present invention has the above-described specific ΔT, is excellent in dispersibility of the cellulose fiber, and exhibits an excellent elongation property at room temperature and at high temperature, as described later in details.

In another aspect of the resin formed body of the present invention, the above-described resin formed body includes a resin formed body having $\Delta T_m$ and $\Delta T_c$ expressed in the following formulae (2) and (3) and satisfying $\Delta T_m < \Delta T_c$.

$$\Delta T_m = T_{m(PP)} - T_{m(PP\ Cell)} \quad (2)$$

$$\Delta T_c = T_{c(PP)} - T_{c(PP\ Cell)} \quad (3)$$

In the above-described formulae, $T_{m(PP)}$ indicates a melting point of the polypropylene resin constituting the above-described cellulose fiber-reinforced polypropylene resin formed body. $T_{m(PP\ Cell)}$ indicates a melting point of the above-described cellulose fiber-reinforced polypropylene resin formed body. $T_{c(PP)}$ indicates a crystallization temperature of the polypropylene resin constituting the above-described cellulose fiber-reinforced polypropylene resin formed body, and $T_{c(PP\ Cell)}$ indicates a crystallization temperature of the above-described cellulose fiber-reinforced polypropylene resin formed body.

The difference expressed by the above-described $\Delta T_c - \Delta T_m$ is preferred to be 0.5° C. or more in terms of further improving the elongation property. The upper limit value is not specifically limited, but it is practical that the difference expressed by the above-described $\Delta T_c - \Delta T_m$ is 10.0° C. or less.

As described later in details, since the resin formed body of the present invention is the resin formed body that has the above-described $\Delta T_c$ and $\Delta T_m$ satisfying the specific relation and is excellent in dispersibility of the cellulose fiber, the resin formed body of the present invention can exhibit an excellent elongation property at room temperature and at high temperature.

Here, the melting point $T_{m(PP)}$ and the crystallization temperature $T_{c(PP)}$ of the polypropylene resin and the melting point $T_{m(PP\ Cell)}$ and the crystallization temperature $T_{c(PP\ Cell)}$ of the cellulose fiber-reinforced polypropylene resin formed body described above are values measured by differential scanning calorimetry (DSC), and the detail is as described later in Examples.

The following describes constituents of the resin formed body of the present invention.

(Cellulose Fiber)

The cellulose fiber for use in the present invention is a fibrous cellulose.

One type or two or more types of cellulose fibers may be included in the resin formed body of the present invention.

Derivations of the above-described cellulose fibers are not specifically limited and specific examples thereof include cellulose fibers obtained using, for example, wood, bamboo, hemp, jute, kenaf, agricultural product remains or wastes (for example, straw of wheat or rice plant, corn, stalks of cotton, and sugar cane), cloth, regenerated pulp, and waste paper as a raw material. The pulp is also a raw material for paper and consists primarily of a tracheid which is extracted from a plant. From a chemical viewpoint, a primary constituent of the pulp is a polysaccharide and its primary constituent is cellulose. As the cellulose fiber for use in the present invention, the cellulose fiber derived from wood is particularly preferred.

The above-described cellulose fibers are not specifically limited and the cellulose fiber obtained by any desired production method can be used. For example, specific examples thereof include cellulose fibers obtained by mechanical processing that performs a grinding process with a physical force, or by chemical processing, such as the kraft pulp method, the sulfide pulp method, and the alkaline pulp process, or by combined use of such processings. In the above-described chemical processing, using a chemical, such as a caustic soda, and the like, lignin, hemicellulose, and the like can be removed from a plant material, such as wood, to extract almost pure cellulose fiber. The cellulose fiber thus obtained is also referred to as a pulp fiber.

The cellulose fiber for use in the present invention is preferably the cellulose fiber prepared by the chemical processing, in terms of improving mechanical properties, such as a specific strength and high elastic modulus at high temperature, and more preferably, the cellulose fiber prepared by the kraft pulp method. In the case of the cellulose fiber that has undergone the above-described chemical processing, the lignin and the like are not remained in the cellulose fiber, and therefore, the polypropylene easily forms a β-crystal that contributes to the improved mechanical properties. It is considered that this is partly because an interaction at an interface between the polypropylene resin and the cellulose fiber is not inhibited by the lignin.

The cellulose fiber for use in the present invention has a diameter of preferably 1 to 30 μm, more preferably 1 to 25 μm, and further preferably 5 to 20 μm. The length (fiber length) of the cellulose fiber is preferably 10 to 2200 μm, and more preferably 50 to 1000 μm.

The diameter of the cellulose fiber contained in the resin formed body of the present invention can be measured by a scanning electron microscope (SEM) and a fiber analyzer. The fiber length of the cellulose fiber also can be measured by the SEM observation. In the measurement of the fiber length by the SEM observation, a residue after eluting a polypropylene resin in a fiber-reinforced polyolefin resin formed body by using a hot xylene is placed on a stage, and processing, such as vapor deposition, is performed, thus allowing determination of the fiber length by the SEM observation.

The content of the cellulose fiber in the resin formed body is preferably 1 to 50 mass parts, and especially preferably 5 to 30 mass parts, in 100 mass parts of the total amount of the polypropylene resin and the cellulose fiber.

(Polypropylene Resin)

The polypropylene resin for use in the present invention is not specifically limited, and for example, any of homo-polypropylene, polypropylene block copolymer, or polypropylene random copolymer can be used.

Specific examples of polypropylene in the polypropylene resin include a propylene homopolymer, a propylene-ethylene random copolymer, a propylene-α-olefin random copolymer, a propylene-ethylene-α-olefin copolymer, and a propylene block copolymer (copolymer that contains a propylene homopolymer component or copolymer component that mainly contains propylene, and a copolymer component obtained by copolymerizing at least one monomer selected from ethylene and α-olefin with propylene). These polypropylenes may be used singly or two or more kinds thereof may be used in combination.

As α-olefin for use in a polypropylene resin, 1-butene, 1-pentene, 1-hexene, 4-methyl-1-pentene, 1-octene, and 1-decene are preferable, and 1-butene, 1-hexene, and 1-octene are more preferable.

Specific examples of the propylene-α-olefin random copolymer include a propylene-1-butene random copolymer, a propylene-1-hexene random copolymer, a propylene-1-octene random copolymer, and the like.

Specific examples of propylene-ethylene-α-olefin copolymer include a propylene-ethylene-1-butene copolymer, a propylene-ethylene-1-hexene copolymer, a propylene-ethylene-1-octene copolymer, and the like.

Specific examples of the propylene block copolymer include
a (propylene)-(propylene-ethylene) copolymer,
a (propylene)-(propylene-ethylene-1-butene) copolymer,
a (propylene)-(propylene-ethylene-1-hexene) copolymer,
a (propylene)-(propylene-1-butene) copolymer,
a (propylene)-(propylene-1-hexene) copolymer,
a (propylene-ethylene)-(propylene-ethylene) copolymer.
a (propylene-ethylene)-(propylene-ethylene-1-butene) copolymer,
a (propylene-ethylene)-(propylene-ethylene-1-hexene) copolymer.
a (propylene-ethylene)-(propylene-1-butene) copolymer.
a (propylene-ethylene)-(propylene-1-hexene) copolymer.
a (propylene-1-butene)-(propylene-ethylene) copolymer,
a (propylene-1-butene)-(propylene-ethylene-1-butene) copolymer,
a (propylene-1-butene)-(propylene-ethylene-1-hexene) copolymer,
a (propylene-1-butene)-(propylene-1-butene) copolymer,
a (propylene-1-butene)-(propylene-1-hexene) copolymer, and the like.

Among these polypropylene resins, homo-polypropylene, propylene-ethylene-1-octene copolymer, or polypropylene block copolymer is preferable from the aspect of a tensile strength and an impact resistance.

The fluidity of the polypropylene resin is also not limited, and a polypropylene resin having appropriate fluidity in consideration of the thickness, the volume, or the like of the formed body can be used.

One polypropylene resin may be used alone, or two or more may be mixed for use.

The content of the polypropylene resin in the resin formed body of the present invention is preferably 60 to 99 mass parts, and especially preferably 70 to 95 mass parts, in 100 mass parts of the total amount of the polypropylene resin and the cellulose fiber.

The resin formed body of the present invention may include a polypropylene resin which has been modified with an acid (hereinafter also referred to as an "acid modified polypropylene resin") as a part of the polypropylene resin.

When the acid modified polypropylene resin is contained in the resin formed body as a part of the polypropylene resin, the mechanical strength, such as a tensile strength and an elastic modulus, of the formed body can be effectively increased together with an adhesiveness improving effect between the polypropylene resin which has not been modified with an acid and the cellulose fiber caused by the acid modified polypropylene resin. Furthermore, the orientation degree of the cellulose fiber can be more increased, and this is also considered to contribute to the improvement of the mechanical properties, such as a tensile strength and an elastic modulus, of the formed body.

The acid modified polypropylene resin includes the one obtained by modifying the above-described polypropylene resin with, for example, unsaturated carboxylic acid or its derivative. The unsaturated carboxylic acid includes, for example, maleic acid, fumaric acid, itaconic acid, acrylic acid, and methacrylic acid, and the unsaturated carboxylic acid derivative includes, for example, maleic anhydride, itaconic acid anhydride, methyl acrylate, ethyl acrylate, butyl acrylate, glycidyl acrylate, methyl methacrylate, ethyl methacrylate, butyl methacrylate, glycidyl methacrylate, maleic acid monoethyl ester, maleic acid diethyl ester, fumaric acid monomethyl ester, and fumaric acid dimethyl ester.

As the acid modified polypropylene resin, it is preferable to contain maleic acid modified polypropylene and/or maleic anhydride modified polypropylene.

When the resin formed body of the present invention includes the acid modified polypropylene resin, the content of the acid modified polypropylene resin in the resin formed body of the present invention is preferably 0.3 mass parts to mass parts, and especially preferably 1 mass parts to 15 mass parts, in 100 mass parts of the total amount of the polypropylene resin (sum of the polypropylene resin which has not been modified with an acid and the acid modified polypropylene resin) and the cellulose fiber. By setting the content of the acid modified polypropylene resin in the above-described range, the mechanical properties, such as a tensile strength and an elastic modulus, of the resin formed body can be more improved.

(Other Constituents)

The resin formed body of the present invention may have the above-described configuration that contains the polypropylene resin and the cellulose fiber, or may contain constituents and the like below in a range in which the effect of the invention is not impaired.

For example, an elastomer of ethylene-α-olefin copolymer or the like may be additionally combined to modify the physical property of the resin formed body.

Into the resin formed body of the present invention, other constituents can be appropriately incorporated in the range in which the above-described purpose is not adversely affected, such as an antioxidant, a light stabilizer, a radical scavenger, an ultraviolet absorber, a colorant (dye, organic pigment, inorganic pigment), a filler, a slipping agent, a plasticizer, a processing aid such as an acrylic processing aid, a foaming agent, a lubricant such as paraffin wax, a surface treatment agent, a nucleating agent, a releasing agent, a hydrolysis inhibitor, an anti-blocking agent, an antistatic agent, an anticlouding agent, a fungicidal agent, an ion trapping agent, a flame retardant, and a flame retardant aid.

In addition, for example, when the resin formed body is formed by a preferable producing method for the resin formed body of the present invention described later, the resin formed body of the present invention may include or may be without a hydrophilic compound, such as water and maleic anhydride.

(Crystalline Structure of Polypropylene)

It has been known that polypropylene mainly adopts a crystalline structure referred to as an α-crystal. The α-crystal is a monoclinic crystal.

The resin formed body of the present invention has the diffraction peaks at the positions of the scattering vector s of $1.61 \pm 0.1$ $nm^{-1}$ and $1.92 \pm 0.1$ $nm^{-1}$ each observed in the wide-angle X-ray diffraction measurement. That is, in the resin formed body of the present invention, at least a part of the polypropylene has the crystalline structure, and at least a part of it is the α-crystal. The crystalline structure other than the α-crystal, occupied in the crystalline structure of the polypropylene is not specifically limited, but, for example, the β-crystal is preferred.

(Method for Confirming α-Crystal of Polypropylene)

The X-ray diffraction measurement can be used for confirming the presence of the α-crystal. The wide-angle X-ray diffraction measurement is preferably used. In a case of a common extended formed body, intensity distribution occurs in an azimuthal direction derived from resin orientation in some cases. Therefore, since a one-dimensional scintillation counter fails to accurately capture the intensity distribution derived from orientation in some cases, a two-dimensional detector is preferably used as the detector. CuKα ray is preferably used as an X-ray source, and the shape for use is preferably a pinhole. The beam diameter of the X-ray is preferably 5 μm to 1500 μm, and more preferably 7 μm to 1000 μm. The beam diameter larger than 1500 μm cannot obtain a sufficient position resolution, and is not suitable for detailed analysis in some cases. In a case of less than 5 μm, the irradiation intensity is not sufficient due to the small beam diameter, and the measurement time is significantly lengthened, thus decreasing the measurement efficiency in some cases.

Specifically, it can be performed by a method described in the example section.

(Method for Determining Presence of Cellulose Fiber)

It has been known that cellulose of a cellulose fiber adopts various crystalline structures, such as a type I or a type II. Natural cellulose has a crystalline structure of a type $I_\alpha$ (triclinic crystal) or a type $I_\beta$ (monoclinic crystal), and plant-derived cellulose generally contains a lot of type $I_\beta$ crystals.

The resin formed body of the present invention has the diffraction peak at the position of the scattering vector s of $3.86 \pm 0.1$ $nm^{-1}$ in the wide-angle X-ray diffraction measurement. This diffraction peak is derived from a (004) plane of the $I_\beta$ type crystal of the cellulose. That is, in the resin formed body of the present invention, at least a part of the cellulose of the cellulose fiber has the crystalline structures, and at least a part of them is the $I_\beta$ type crystal. The crystalline structures other than the $I_\beta$ type crystal in the crystalline structures of the cellulose are not specifically limited. Hereinafter, the cellulose fiber is referred to as a "component having the diffraction peak at the position of the scattering vector s of $3.86 \pm 0.1$ $nm^{-1}$" in some cases.

Containing the cellulose fiber can be confirmed by various methods. For example, it can be confirmed by observing the diffraction peak derived from cellulose crystal in the cellulose fiber using the X-ray. While it is necessary to be careful because the diffraction peak position differs depending on the wavelength of the X-ray used, the diffraction peak derived from the (004) plane of the $I_\beta$ type crystal of the cellulose can be observed in the proximity of the scattering vector s of 3.86 nm$^{-1}$ (2θ=34.6°) when the CuKα ray (λ=0.15418 nm) is used. For capturing the diffraction of the (004) plane, the X-ray needs to be incident on a sample that is rotated by a degree of θ. That is, when the CuKα ray is used, a sample stage is to be rotated by θ=17.3°. While other diffraction peaks as the diffraction peaks derived from the cellulose crystal can be observed inside the (004) plane, their diffraction positions overlap with that of a diffraction peak derived from polypropylene, thus it is not possible to determine them as definite diffraction peaks in some cases. In view of this, in this description, the presence/absence of the cellulose fiber is determined using the diffraction peak of the $I_β$ type crystal (004) plane of the cellulose.

(Orientation Degree of Cellulose Fiber)

The orientation degree of the cellulose fiber (component having the diffraction peak at the position of the scattering vector s of 3.86±0.1 nm$^{-1}$) is preferably more than 0.15 and less than 0.80 in terms of improving the mechanical property.

When the improvement of the above-described mechanical property in a normal direction with respect to the arrangement (orientation direction) of the cellulose fiber is considered, the orientation degree of the above-described cellulose fiber is more preferably 0.18 or more and 0.75 or less, and further preferably 0.20 or more and 0.70 or less.

(Method for Measuring Orientation Degree of Cellulose Fiber)

The orientation degree of the cellulose fiber can be obtained by analyzing profiles in an azimuthal direction of diffraction intensities derived from the cellulose (004) plane based on the two-dimensional diffraction image of the X-ray obtained according to the above-described confirmation method of containing the cellulose fiber. The analysis method includes a method for analysis using a half-value width of the diffraction peak in the azimuthal direction, and a method for obtaining using an orientation function. For the confirmation of the orientation degree of the cellulose fiber, the sample may be cut out to be devised so as to obtain a satisfactory diffraction image. More specifically, for example, it is included that the sample is cut out at any given position for the purpose of adjusting absorption of the X-ray by the sample, thereby adjusting the thickness to approximately 0.2 to 1 mm.

(Detailed Method for Calculating Orientation Degree of Cellulose Fiber)

The X-ray diffraction pattern derived from the $I_β$ type crystal (004) plane of the cellulose of the cellulose fiber is used to determine the orientation degree of the cellulose fiber. The two-dimensional diffraction pattern of the $I_β$ type crystal (004) plane of the cellulose of the cellulose fiber is one-dimensionalized into data of azimuth angle versus intensity. For one-dimensionalizing the two-dimensional data, one-dimensionalization is performed in a range of ±0.5° centered on 34.6° of the $I_β$ type crystal (004) plane of the cellulose of the cellulose fiber. Since the diffraction peak derived from the polypropylene resin is also present nearby, in order to eliminate its influence, the one-dimensionalization can be performed in ranges of ±0.5° centered on 33.6° and 35.6°, and an average value of them can be subtracted from the one-dimensional diffraction intensity of the $I_β$ type crystal of the cellulose of the cellulose fiber. While the orientation degree is determined for the corrected data of the azimuth angle diffraction intensity of the $I_β$ type crystal of the cellulose of the cellulose fiber, any of a half-value width method that uses the half-value width for calculation or an orientation function method using the orientation function may be used for the determination of the orientation degree.

When obtaining the orientation function or the half-value width, the analysis may be performed using a function obtained in the peak separation, in order to reduce a noise of data obtained by using a method, such as a peak separation of diffraction intensity in the azimuthal direction. An operation of the above-described intensity correction or the like may be performed together with this operation. The function used for the peak separation and the fitting is preferably a Gaussian function or a Lorentz function, and more preferably a Lorentz function.

—Elongation at Break—

An elongation at break of the resin formed body of the present invention can be measured by a method and conditions described in Examples.

The resin formed body of the present invention has high values in elongation at break at both temperatures of room temperature (25° C.) and high temperature (100° C.), thereby being excellent in elongation property at both room temperature and high temperature. In particular, the elongation at break at high temperature is preferably 650% or more, more preferably 700% or more, and further preferably more than 700%.

Note that the elongation at break of the fiber-reinforced resin formed body usually has different values depending on a direction of measurement. In view of this, in the present invention, the above-described elongation at break means a measurement value in a direction in which the resin formed body exhibits the maximum elongation at break.

The resin formed body of the present invention exhibits an excellent elongation property at both room temperature and high temperature. While the reason behind it is not clear, it is considered as follows.

In the conventional fiber-reinforced polypropylene resin formed body, when a fiber, such as cellulose, is kneaded with a resin, a stress easily concentrates on an interface between the resin and the fiber, and void, crack, and the like starting from this interface are easily formed, and thus, the elongation property (the elongation at break) tends to be degraded.

Meanwhile, the resin formed body of the present invention is the cellulose fiber-reinforced polypropylene resin formed body having the diffraction peak derived from the polypropylene α-type crystal and the diffraction peak derived from the cellulose $I_β$ type crystal, where ΔT is 40° C. or more or $\Delta T_m < \Delta T_c$ is satisfied. Such a resin formed body has highly enhanced dispersibility of the cellulose fiber inside the polypropylene resin, and thus, it is considered that the concentration of stress is less likely to occur and the excellent elongation property is exhibited at both room temperature and high temperature.

In one aspect of the resin formed body of the present invention, as the result of improved dispersibility of the cellulose fiber inside the polypropylene resin in the cellulose fiber-reinforced polypropylene resin formed body having the diffraction peaks derived from the above-described crystals, there is observed a phenomenon that the crystallization temperature shifts to the low temperature side compared with the case of the polypropylene resin alone, and $\Delta T_m$ and $\Delta T_c$ expressed in the formulae (2) and (3), which are the difference in melting point and the difference in crystallization temperature between the polypropylene resin constituting the resin formed body and the resin formed body itself, satisfy $\Delta T_m < \Delta T_c$. It is considered that, in the resin formed body of the present invention in which the cellulose fiber thus exhibits the excellent dispersibility, the concentration of the stress is less likely to occur, and therefore, the resin formed body that exhibits the excellent elongation property at room temperature and at high temperature can be obtained.

As described above, the resin formed body of the present invention exhibits the excellent elongation property at room temperature and at high temperature, thereby improving the mechanical properties, such as an impact resistance.

The improvement effect in mechanical property by the resin formed body of the present invention can be obtained irrespective of the fiber length of the cellulose fiber as indicated in Examples 1 and 2 described later.

{Production of Resin Formed Body}

The producing method of the resin formed body of the present invention is not specifically limited as long as the resin formed body that satisfies the specifications of the present invention can be formed.

The method for producing the resin formed body of the present invention preferably includes a step of kneading at least a melt-kneaded product of a polypropylene resin and a cellulose fiber and a hydrophilic compound, such as the water and the maleic anhydride (hereinafter referred to as a "kneading step"), and more preferably includes a step of melt-kneading them.

The above-described kneading step loosens the aggregation of the cellulose fiber kneaded in the polypropylene resin with the hydrophilic compound, such as the water and the maleic anhydride, and the cellulose fiber is dispersed better in the polypropylene resin. As a result, the resin formed body having the above-described ΔT in a specific value and the resin formed body that satisfies the above-described $\Delta T_m < \Delta T_c$ are obtained. The combined amount of the above-described hydrophilic compound with respect to the cellulose fiber is 10 mass parts or more and less than 150 mass parts, and preferably 25 to 125 mass parts, in terms of better dispersion and capability of kneading step of the cellulose fiber in the propylene resin.

Meanwhile, even though the conventional production method in which the aliphatic polyester resin is kneaded with the mixture of the cellulose fiber and a cellulose amorphous region swelling agent, such as the water, as described in Patent Literatures 2 and 3, is applied to a system using the polypropylene resin not the aliphatic polyester resin, it is difficult to knead by introducing the water into the extruder due to an effect of a large amount of water. That is, it is difficult to obtain the resin formed body of the present invention with the above-described method.

(Kneading Step)

The above-described kneading step is not specifically limited as long as the dispersibility of the cellulose fiber in the polypropylene resin can be increased to a desired level.

The kneading temperature in the above-described kneading step is not specifically limited as long as the cellulose fiber is dispersed, but is preferably a temperature equal to or more than the melting point of the polypropylene resin to be used, and specifically, 160 to 230° C. is preferred, and 170 to 210° C. is more preferred.

In the above-described kneading step, in addition to the polypropylene resin and the cellulose fiber, an antioxidant and the like may be added and kneaded for, for example, the purpose of reducing heat deterioration and oxidative degradation.

The above-described hydrophilic compound is not specifically limited as long as it is a hydrophilic compound that acts to loosen the aggregation of the cellulose fiber in the above-described kneading step, and the water, the maleic anhydride, and the like can be used. For the above-described hydrophilic compound, one kind may be used or two or more kinds may be used. Also, the compound may be used alone or a solution in which the hydrophilic compound is dissolved in a solvent may be used (hereinafter also referred to as an "additive" in the sense to include both the hydrophilic compound alone and the solution of the hydrophilic compound). The above-described additive is preferred to be supplied in a form of liquid to the melt-kneaded product of the polypropylene resin and the cellulose fiber described above. The above-described solvent is not specifically limited as long as the above-described hydrophilic compound can be dissolved, and acetone, ethanol, and the like can be used.

The above-described hydrophilic compound may or may not be reacted with at least any of the polypropylene resin and the cellulose fiber.

The kneading period in the above-described kneading step can be appropriately set in order to make a desired kneaded state.

Examples of a device used in the above-described kneading step include a single-screw or twin-screw extruder and the like, and the twin-screw extruder is preferred. When a blender, a kneader, a mixing roll, or a banbury mixer is used, the kneading cannot be performed under a pressure condition exceeding a saturated vapor pressure of the above-described additive, and thus, the dispersibility of the cellulose fiber is difficult to be increased to the desired level.

The above-described extruder and the like may appropriately include regularly used equipment, examples of which include, for example, a feeder, a hopper, a liquid sending pump, a vacuum pump, a die, and a vent portion.

For example, in the above-described kneading step, when the above-described hydrophilic compound is supplied to the melt-kneaded product of the polypropylene resin and the cellulose fiber, it is preferred to supply the above-described hydrophilic compound using a liquid sending pump.

After the above-described kneading step, it is also preferred to provide a step of removing the above-described hydrophilic compound in excess in the resin formed body with a vacuum pump. The pressure reduction condition by the above-described vacuum pump can be appropriately set.

The above-described kneading step and a melt-kneading step (hereinafter referred to as a "melt-kneading step (A)") of preparing the melt-kneaded product of the polypropylene resin and the cellulose fiber described below may be performed simultaneously in the extruder or the above-described kneading step and the later-described melt-kneading step (A) may be separately performed.

From the aspect of handleability in forming, the obtained kneaded product is preferred to be processed into a pellet form.

(Preparation of Melt-Kneaded Product of Polypropylene Resin and Cellulose Fiber)

The melt-kneaded product of the polypropylene resin and the cellulose fiber used in the above-described kneading step is not specifically limited as long as the melt-kneading step (A) of the polypropylene resin and the cellulose fiber is included, and can be prepared in an ordinary method.

Pre-dried cellulose fiber may be used in order to adjust a moisture amount of the cellulose fiber. The above-described drying condition is not specifically limited, but, for example, the drying temperature is preferably 60 to 150° C., and more preferably 70 to 120° C. When the temperature in the drying step is lower than the above-described preferred lower-limit value, the cellulose fiber has a high water content rate, and therefore, the cellulose fiber may stick to the hopper when it is added into the hopper during the above-described kneading step to sometimes cause a difficulty in quantitative supply. When the drying temperature is higher than the above-described preferred upper-limit value, the cellulose fiber may be discolored and deteriorated. The drying period can also be appropriately adjusted.

The melt-kneading temperature in the above-described melt-kneading step (A) is not specifically limited as long as it is a temperature equal to or more than the melting point of the polypropylene resin, but, for example, is preferably 160 to 230° C., and is more preferably 170 to 210° C.

The upper-limit value of the above-described melt-kneading temperature is preferably 250° C. or less, more preferably 230° C. or less, and further preferably 200° C. or less from the aspect of reducing the pyrolysis of the cellulose fiber.

In the above-described melt-kneading step (A), in addition to the polypropylene resin and the cellulose fiber, an antioxidant and the like may be added and melt-kneaded for, for example, the purpose of reducing heat deterioration and oxidative degradation.

The melt-kneading period in the above-described melt-kneading step (A) is not specifically limited, and can be appropriately set.

A device used in the above-described melt-kneading is not specifically limited as long as it can perform melt-kneading at the melting point of the polypropylene resin or higher temperature, and examples of the device includes, for example, a blender, a kneader, a mixing roll, a banbury mixer, a single-screw or twin-screw extruder, and the like, but the twin-screw extruder is preferred.

From the aspect of handleability in a subsequent forming step, the obtained melt-kneaded product is preferably processed into a pellet form (hereinafter, the obtained pellet is also simply referred to as a "pellet"). The conditions for pellet processing are not specifically limited, but it can be processed according to a usual method. For example, a method in which, after water cooling the melt-kneaded product, the melt-kneaded product is processed into a pellet form using a strand cutter or the like is included as an example.

Note that, before the melt-kneading, each of the components may be dry-blended (mixed in advance). Dry-blending is not specifically limited, and can be performed according to a usual method.

(Kneader Used in Kneading Step)

A kneader used in the above-described kneading step is preferably the twin-screw extruder.

While there is a chance of sufficiently obtaining the pressure in the kneading step, which will be described later, when the single-screw extruder is used, a shear force applied to the material for kneading in the extruder is insufficient and it is difficult to obtain sufficient dispersibility. When a batch type kneader, including a kneader and the like, is used, even though there is a chance of sufficiently obtaining the shear force to be applied, it is hard to obtain sealability to have a difficulty in sufficiently increasing the pressure inside the kneader, thereby being difficult to obtain sufficient dispersibility (see Comparative Example 1c). Examples of the batch type kneader include a batch-type sealed kneading (mixing) device as a device disclosed in a pamphlet of WO2004/076044 and a batch-type closed kneading device disclosed in a pamphlet of WO2019/039570 or WO2019/039571. Even when these sealed or closed batch type kneader is used, it is difficult to sufficiently increase the pressure inside the kneader, thereby being difficult to obtain sufficient dispersibility.

(Screw Configuration of Twin-Screw Extruder)

From the aspect of adding the above-described additive as a liquid into the melt-kneaded product of the polypropylene resin and the cellulose fiber and kneading the mixture, it is preferred to use the twin-screw extruder with screws having a compression structure with two or more stages. Using the screws having the compression structure with two or more stages ensures efficiently kneading and dispersing the cellulose in the polypropylene resin. When screws without the compression structure are used, it is difficult to add and knead the above-described additive as a liquid (see Comparative Example 1e). When screws having a single-stage compression structure are used, while there is a chance of sufficiently obtaining the pressure in the kneading step, which will be described later, an ability to forwardly send out the liquid to be added is low during an extruding step to possibly cause a leakage of the liquid from a gap and a hopper side of the extruder and possibly fail to sufficiently ensure a period of existing as a liquid exceeding a saturated vapor pressure in the kneading step, thereby being difficult to obtain sufficient dispersibility (see Comparative Example 1d).

The above-described compression structure means a structure in which a screw piece in a reversed flight structure is disposed in the extruder, and the above-described compression structure with two or more stages means a structure that performs compressing over at least two stages, that is, having two or more compression portions (preferably, a compression portion including at least a first compression portion and a second compression portion described below).

The compression structure with two or more stages is not specifically limited, but it is more preferred to use a compression structure with three or more stages.

L/D, the rate of the length (L) to the maximum outer diameter (D) of the screw of the extruder, is not specifically limited, but is preferably 30 or more, more preferably 35 or more, and further preferably 40 or more. The upper-limit value of L/D is not specifically limited, but 60 or less is practical. By setting L/D of the extruder to be within the above-described preferred range, the screw configuration having the above-described compression structure with two or more stages is easily assembled and the sufficient dispersibility is easily ensured.

(Each Compression Portion in Screw of Twin-Screw Extruder)

Each of the compression portions in the screws of the twin-screw extruder will be described. Each of the compression portions are disposed in the order of the first compression portion, the second compression portion, and a third compression portion from a side close to a material input portion.

The first compression portion is disposed as a fusion portion and has a function to promote melting of a resin.

The second compression portion is disposed as a dispersion portion and has a function to knead and disperse the liquid of the above-described additive without being flown backward under the pressure condition exceeding the saturated vapor pressure of the additive.

The third compression portion is disposed as a vent portion and is a damming effect for reducing the pressure in order to remove a liquid at a vent port at a tip of the third compression portion.

When there is no need for removing the liquid, the above-described third compression portion is not necessary, and it is preferred to use the twin-screw extruder with the screws having the two-stage compression structure of the first compression portion and the second compression portion described above. Conversely, when the liquid is to be removed, the twin-screw extruder with the screws having the compression structure with three or more stages having at least the first compression portion to the third compression portion described above is preferred.

The above-described additive is preferred to be added at any position from the first compression portion to the second compression portion, and is more preferred to be added in the second compression portion.

The above-described first compression portion to third compression portion may have another function as long as they have the above-described functions. For example, the kneading under the pressure conditions exceeding the saturated vapor pressure of the above-described additive may be performed at least in the second compression portion, and, for example, the first compression portion may include the function of the second compression portion.

(Dispersion Portion of Screw of Twin-Screw Extruder)

The kneading in the second compression portion (the dispersion portion) is preferred to be performed under the pressure condition exceeding the saturated vapor pressure of the additive from the aspect of achieving good dispersibility of the cellulose fiber in the polypropylene resin.

The specific example for the saturated vapor pressure of the additive is as follows.

The saturated vapor pressure of water is 0.8 MPa at 170° C., 1.0 MPa at 180° C., and 1.3 MPa at 190° C. The saturated vapor pressure of maleic anhydride is 0.1 MPa at 200° C. The saturated vapor pressure of a solution of a hydrophilic compound can be calculated by Raoult's law. For example, the saturated vapor pressure of acetone is 2.7 MPa at 200° C.

The pressure condition of the kneading in the second compression portion (the dispersion portion) is preferably more than the saturated vapor pressure+0.20 MPa, more preferably the saturated vapor pressure+0.25 MPa or more, and further preferably the saturated vapor pressure+0.30 MPa or more when the maleic anhydride is used as the hydrophilic compound from the aspect of further improving the dispersibility. From the similar aspect, when the water is used as the hydrophilic compound, the saturated vapor pressure+0.5 MPa or more is preferred, the saturated vapor pressure+0.75 MPa or more is more preferred, the saturated vapor pressure+1.0 MPa or more is further preferred, the saturated vapor pressure+1.3 MPa or more is especially preferred, and the saturated vapor pressure+1.5 MPa or more is the most preferred.

When the pressure condition during the kneading in the second compression portion (the dispersion portion) is equal to or less than the saturated vapor pressure of the additive, the liquid of the additive is dissipated from, for example, a gap of a barrel of the extruder, thereby being difficult to sufficiently obtain the effect of adding and kneading the additive as a liquid.

The pressure during the kneading in the second compression portion (the dispersion portion) is preferably 20 MPa or less, and more preferably 15 MPa or less. When the pressure is too high, the resin and the cellulose fiber are accumulated in the kneading portion of the extruder to cause quality deterioration, such as discoloration and heat deterioration, of the cellulose fiber in some cases.

(Forming)

The kneaded product obtained in the above-described kneading step is preferred to include a step of forming into a desired shape.

The above-described forming method is not specifically limited, but, for example, a method to injection-mold the kneaded product, such as the above-described pellet, is included as an example.

In the above-described injection molding, the injected resin temperature is not specifically limited as long as it is at a temperature equal to or more than a melting point of the polypropylene resin, and is preferably 160 to 230° C. and is more preferably 170 to 210° C.

The conditions, such as a mold temperature, used during the above-described injection molding, can be appropriately adjusted.

Applications

The resin formed body of the present invention is excellent in elongation property at room temperature and at high temperature. The sufficient elongation property at room temperature leads to durability at deformation, that is, an impact resistance, and the sufficient elongation property at high temperature leads to easiness of high temperature processing (in particular, drawing), that is, formability. In view of this, the resin formed body of the present invention can be preferably used as, for example, a material for transport equipment, with properties of a lightweightness that the fiber-reinforced resin originally has and a high specific strength.

Specifically, the resin formed body of the present invention can be used as materials of products, components and/or members, and the like below. For example, transport equipment (automobile, motorcycle, train, aircraft, and the like), a structural member of a robot arm, a component of an amusement robot, a member of an artificial limb, a material of a home appliance, a housing of OA equipment, information processing equipment, a mobile terminal, a building material, a film for plastic greenhouse, drainage equipment, a material of a toiletry product, various kinds of tanks, a container, a sheet, a packing material, a toy, and sport goods, are included.

The material for the transport equipment includes a vehicle material. The vehicle material includes, for example, interior components, such as trims, such as a dashboard trim, a door trim, and a pillar trim, a meter panel, a meter housing, a glove compartment, a package tray, a roof head lining, a console, an instrumental panel, an arm rest, a seat, a seat back, a trunk lid, a trunk lid lower, a door inner panel, a pillar, a spare tire cover, a door knob, a light housing, and a back tray; exterior components, such as a bumper, a hood, a spoiler, a radiator grille, a fender, a fender liner, a rocker panel, a side step, a door outer panel, a side door, a back door, a roof, a roof carrier, a wheel cap cover, a side-view mirror cover, and an undercover; other components, such as a battery case, an engine cover, a fuel tank, an oil filler box, an air intake duct, an air cleaner housing, an air conditioner housing, a coolant reservoir tank, a radiator reservoir tank, an window washer tank, an intake manifold, a rotating member, such as a fan and a pulley; a component, such as a wire harness protector; a connection box or a connector, and an integrally molded component, such as a front end module and a front end panel.

EXAMPLES

The present invention will be described in more detail based on examples given below, but the invention is not meant to be limited by these.

In the examples and comparative examples below, "parts" means "mass parts" unless otherwise stated.

In the following examples, the polypropylene resin which has not been modified with an acid is simply referred to as the "polypropylene resin" for convenience, and is distinguished from the acid modified polypropylene resin.
—Used Materials—
The following shows the used materials.
(Cellulose Fiber)

Cellulose fiber 1: ARBOCEL B400 (trade name), manufactured by RETTENMAIER Co. Ltd., continuous fiber Cellulose fiber 2: powdered cellulose KC FLOCK W-200Y (trade name), manufactured by Nippon Paper Industries Co., Ltd.

Note that, for the cellulose fibers 1 and 2, the cellulose fiber dried by heating in the conditions described in Example 1-1 was used in the kneading with the polypropylene resin.
(Polypropylene Resin)

J106MG: trade name, manufactured by Prime Polymer Co., Ltd., melting point $T_m$: 167.04° C., crystallization temperature $T_c$: 128.52° C.
(Acid Modified Polypropylene Resin)

RIKEAID MG250P: trade name, maleic anhydride modified polypropylene, manufactured by RIKEN VITAMIN CO., LTD.

Example 1: Exemplary Combination Using Proportion of 80 Mass Parts of Polypropylene Resin and 20 Mass Parts of Cellulose Fiber>

Example 1-1

The polypropylene resin and, with respect to 80 mass parts of this polypropylene resin, 20 mass parts of a cellulose fiber 1 (trade name: ARBOCEL B400) that had been dried at 80° C. for 24 hours were each input into a hopper of a twin-screw extruder {manufactured by TECHNOVEL CORPORATION, trade name: KZW15TW-45MG-NH} with a screw diameter of 15 mm and L/D=45 using a feeder with a controlled hourly supply mass. After melt-kneading, the resin discharged from an extrusion die of the extruder was water cooled, and thereafter, was processed into a pellet form using a strand cutter and sufficiently dried, and thus, a "pre-pellet a" was obtained.

Additionally, a maleic anhydride/acetone solution in which 10 g of maleic anhydride was dissolved in 40 g of acetone was prepared.

The feeder with a controlled hourly supply amount input the above-described pre-pellet a into the hopper of the twin-screw extruder (manufactured by TECHNOVEL CORPORATION, trade name: KZW15TW-45MG-NH) with a screw diameter of 15 mm and L/D=45. The screw of the used extruder has a first compression portion (corresponding to between C1 zone and C2 zone), a second compression portion (corresponding to from C3 zone to C4 zone), and a third compression portion (corresponding to C5 zone) in this order from the side close to the hopper. A liquid sending pump (manufactured by Nihon Seimitsu Kagaku Co., Ltd., trade name: NSPUMP SP-Y-4602) that can adjust a flow rate was installed in the C3 zone that corresponded to the second compression portion of the screw and was set to 180° C. of the extruder. While adjusting the combined amount of the maleic anhydride with respect to 100 mass parts of the pre-pellet a to become 2 mass parts, the above-described maleic anhydride/acetone solution was input into the extruder using the above-described liquid sending pump, and was melt-kneaded. A pressure gauge (model number NP463-1/2-10 MPa-15/45K, manufactured by Dynisco Japan, Ltd.) was disposed in the C4 zone and a pressure during the extruding was measured. The pressure gauge disposed in the C4 portion indicated 2.3 MPa. Note that the saturated vapor pressure of the above-described maleic anhydride/acetone solution is 2.0 MPa at 180° C.

From a vent portion that corresponds to the third compression portion of the screw and is disposed at a near side of the extrusion die of the extruder, a gas was discharged using a vacuum pump, and the resin discharged from the extrusion die was water cooled, and thereafter, was processed into a pellet form using the strand cutter, and thus, a pellet A was obtained.

The obtained pellet A was sufficiently dried with a dryer at 80° C. for 16 hours or more, was formed with an injection resin temperature of 190° C. and a mold temperature of 40° C. using an injection molding machine (trade name: ROBOSHOT α-S30iA, manufactured by FANUC CORPORATION), and thus, a resin formed body in a shape of JIS No. 5 dumbbell (hereinafter referred to as a dumbbell test piece) was obtained.

Example 1-2

A dumbbell test piece was obtained in the same manner as Example 1-1 except that water was used instead of the maleic anhydride/acetone solution and the combined amount of the water with respect to 100 mass parts of the pre-pellet a was 20 mass parts in Example 1-1. The pressure during the extruding was indicated as 2.5 MPa by the pressure gauge installed in the C4 portion.

Example 1-3

A dumbbell test piece was obtained in the same manner as Example 1-1 except that the set temperature in the C3 zone was changed to 190° C. The pressure of the extruder was indicated as 2.4 MPa by the pressure gauge installed in the C4 portion. Note that the saturated vapor pressure of the above-described maleic anhydride/acetone solution at 190° C. is 2.3 MPa.

Example 1-4

A dumbbell test piece was obtained in the same manner as Example 1-2 except that the set temperature in the C3 zone was changed to 190° C. The pressure of the extruder was indicated as 1.7 MPa by the pressure gauge installed in the C4 portion.

Comparative Example 1a

A dumbbell test piece was obtained in the same manner as Example 1-1 except that the maleic anhydride/acetone solution was not combined in Example 1-1. The pressure during the extruding was indicated as 2.5 MPa by the pressure gauge installed in the C4 portion.

Comparative Example 1b

A cellulose nanofiber (CNF) aqueous dispersion (manufactured by Nippon Paper Industries Co., Ltd., trade name: cellenpia TC-01A, CNF 1% aqueous dispersion) was input into the hopper of the twin-screw extruder {manufactured by TECHNOVEL CORPORATION, trade name: KZW15TW-45MG-NH} with a screw diameter of 15 mm and L/D=45 so as to have 20 mass parts of CNF addition amount with respect to 80 mass parts of the polypropylene resin and the addition amount was gradually adjusted. When the addition amount of the CNF 1% aqueous dispersion reached around 400 mass parts (4 mass parts in CNF addition amount), the water started to flow backward from the hopper of the extruder to make it difficult to extrude the resin, and thus, the extruded pellet could not be obtained.

What is described above indicates that the fiber-reinforcement by combining the cellulose fiber of desired amount into the polypropylene resin is difficult even though, for example, the conventional production method disclosed in Patent Literatures 2 and 3 is applied to the polypropylene resin.

Comparative Example 1c 80 mass parts of the polypropylene resin, 20 mass parts of the cellulose fiber 1, and 20 mass parts of the water were input into a resin input port of a labo plastomill (HAAKE PolyLab, manufactured by Thermo Fisher Scientific Inc.) as a batch type sealed kneader, after an inside of the kneader was set to 180° C. and the mixture was kneaded, the mixture was processed into a pellet form, and thus, the pellet was obtained. The obtained pellet was sufficiently dried at 80° C. for 16 hours, and was formed under the conditions of an injection resin temperature of 190° C. and a mold temperature of 40° C. using an injection molding machine (trade name: ROBOSHOT α-S30iA, manufactured by FANUC CORPORATION), and thus, a resin formed body in a shape of JIS No. 5 dumbbell was obtained.

The labo plastomill used above corresponds to the batch type sealed kneading (mixing) device as a device disclosed in a pamphlet of WO2004/076044 and the batch type closed kneading device disclosed in a pamphlet of WO2019/039570 or WO2019/039571.

Comparative Example 1d

A dumbbell test piece was obtained in the same manner as Example 1-2 except that the first compression portion (corresponding to between the C1 zone and the C2 zone) was disposed as a screw of the twin-screw extruder and the second compression portion and the third compression portion were not disposed in Example 1-2. The pressure during the extruding was indicated as 1.2 MPa by the pressure gauge installed in the C4 portion.

Comparative Example 1e

A dumbbell test piece was obtained in the same manner as Example 1-2 except that the first compression portion, the second compression portion, and the third compression portion were not disposed as a screw of the twin-screw extruder in Example 1-2. At this time, the injected water flew backward from the hopper side and a water vapor was spewed, and thus, it was difficult to stably obtain the material. The pressure during the extruding was indicated as 0.8 MPa by the pressure gauge installed in the C4 portion.

Reference Example 1

A dumbbell test piece was obtained in the same manner as Example 1-1 except that the combined amount of the polypropylene resin was changed to 100 mass parts, and the cellulose fiber and the maleic anhydride/acetone solution were not used in Example 1. The pressure during the extruding was indicated as 1.5 MPa by the pressure gauge installed in the C4 portion.

Using the dumbbell test pieces obtained in the above-described Examples 1-1 to 1-4, Comparative Examples 1a, 1c, and 1d, and Reference Example 1, the following evaluations were performed. The obtained results are shown in Table 1.

Note that, for Comparative Example 1e, the sample was not obtained, and therefore, the following evaluations were not performed.

—Measurement of Tensile Elongation at Break—
(1) Tensile Test at 100° C.

Using an autograph precision universal testing machine (manufactured by Shimadzu Corporation) including an oven (trade name: TCR-200T+125-XSP Shimadzu Corporation), tensile tests were performed for the dumbbell test pieces under the following conditions.

(Conditions)
Preheating Time of Dumbbell Test Piece in 100° C. constant temperature chamber: 5 minutes
Tension Speed: 50 mm/min
Clamp Distance: 60 mm
(2) Tensile Test at 25° C.

Tensile tests were performed in the same manner as the above-described tensile tests at 100° C. except that the tests were performed at room temperature (25° C.) without using the constant temperature chamber.

From the results of the above-described tensile tests, the tensile elongations at break were calculated using the following formula. In the following formula, $L_0$ indicates a clamp distance before the test of the tensile elongation at break and L indicates a clamp distance at break.

Tensile Elongation at Break $\{\%\}=100\times(L-L_0)/L_0$

Note that, in this test, the measurable maximum tensile elongation at break is 700% due to the used device. Therefore, the test pieces that did not break even with the tension indicating the above-described measurable maximum tensile elongation at break (700%) were expressed as ">700%" in the table.

—DSC Measurement—

DSC measurements were performed using TA-60A (trade name, manufactured by Shimadzu Corporation) complying with JIS K 7121.

5 to 10 mg of a sample for measurement was cut out from the dumbbell test piece and was packed in an aluminum pan to set the sample. Within a temperature range of 40° C. to 200° C., a 1st Run temperature rise measurement was executed at a temperature increase rate of 10° C./min. Thereafter, after holding it at 200° C. for 5 minutes, the temperature was decreased to 40° C. at a temperature decrease rate of 10° C./min (Cooling Run). Thereafter, within a temperature range of 40° C. to 200° C., a 2nd Run temperature rise measurement was executed at a temperature increase rate of 10° C./min.

For the obtained DSC curve of the results of Cooling Run and 2nd Run, a crystallization peak temperature (the crystallization temperature) $T_c$ was obtained from Cooling Run, and a melt peak temperature (the melting point) $T_m$ was obtained from 2nd Run using software TA60 (trade name, manufactured by Shimadzu Corporation). Note that the peak temperature means a temperature that corresponds to an apex of the peak.

Using the crystallization temperature $T_c$ and the melting point $T_m$ obtained above, $\Delta T$, $\Delta T_m$ and $\Delta T_c$ were calculated based on the following formulae (1) to (3), respectively.

Note that $T_{m(PP)}$ indicates a melting point of the sample for measurement from the dumbbell test piece in Reference Example 1, $T_{m(PP\ Cell)}$ indicates a melting point of the sample for measurement from the dumbbell test piece in Example 1-1, 1-2, or Comparative Example 1a, $T_{c(PP)}$ indicates a crystallization temperature of the sample for measurement from the dumbbell test piece in Reference Example 1, and $T_{c(PP\ Cell)}$ indicates a crystallization temperature of the sample for measurement from the dumbbell test piece in Example 1-1, 1-2, or Comparative Example 1a.

$$\Delta T = \text{melting point } T_m - \text{crystallization temperature } T_c \quad (1)$$

$$\Delta T_m = T_{m(PP)} - T_{m(PP\ Cell)} \quad (2)$$

$$\Delta T_c = T_{c(PP)} - T_{c(PP\ Cell)} \quad (3)$$

—Wide-Angle X-Ray Diffraction Measurement—
—Method for Confirming α-Crystal of Polypropylene—

The confirmation was performed by the wide-angle X-ray diffraction measurement using D8 DISCOVER (manufactured by Bruker AXS). The set dumbbell test piece was irradiated with a CuKα ray by a pinhole collimator narrowed down to φ0.5 mm to obtain diffraction, and the obtained diffraction was detected by a two-dimensional detector VANTEC 500 (manufactured by Bruker AXS) set to a camera length of 10 cm, thus obtaining a two-dimensional diffraction image. An integral averaging process was performed to the obtained two-dimensional diffraction image in a range of the scattering vector s of 0 to 2.91 nm$^{-1}$ in an azimuthal direction of 0 to 360°, thus obtaining one-dimensional data. After a correction of subtracting air scattering according to a transmittance of the X-ray was performed to the one-dimensional data, a curve fitting was performed using a Gaussian function, thus separating diffraction components derived from polypropylene crystals and diffraction components derived from amorphous materials. When the diffraction peaks were confirmed at the positions of the scattering vector s of 1.61±0.1 nm$^{-1}$ and 1.92±0.1 nm$^{-1}$, it was determined that the α-crystal was present. This is because the diffraction peak on the polypropylene α-crystal (110) plane appears at the position of the scattering vector s of 1.61±0.1 nm$^{-1}$ and the diffraction peak on the (040) plane appears at the position of the scattering vector s of 1.92±0.1 nm$^{-1}$.

Note that each of the resin formed bodies used for measurement had been appropriately undergone cut out and the like as necessary.

Figure 1:
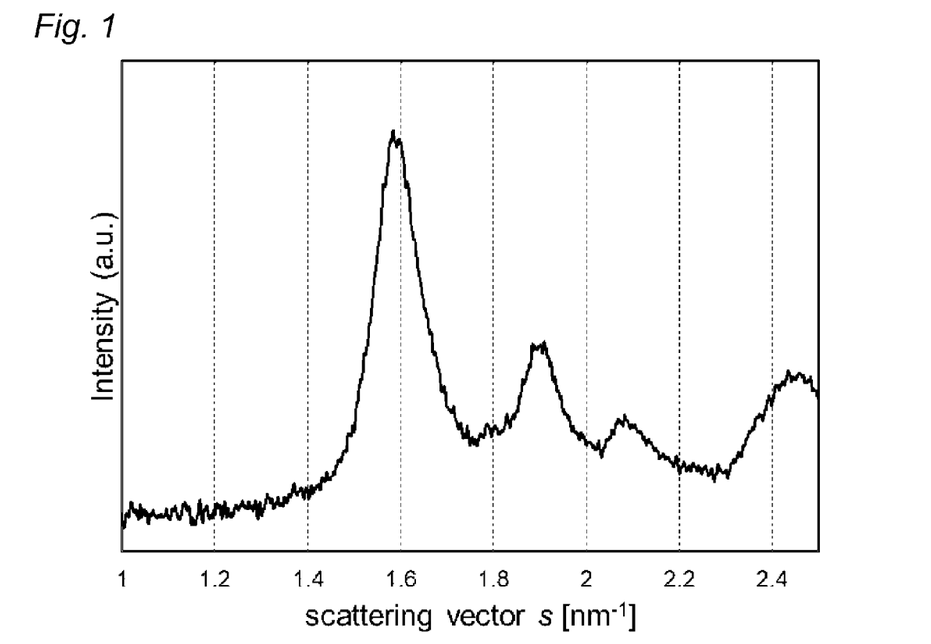

In the table, the diffraction peak at the position of the scattering vector s of 1.61±0.1 nm$^{-1}$ is expressed as a "diffraction peak 1 derived from polypropylene" and the diffraction peak at the position of the scattering vector s of 1.92±0.1 nm$^{-1}$ is expressed as a "diffraction peak 2 derived from polypropylene." For example, in the test piece of Example 1-1, the respective diffraction peaks were confirmed at the positions of the scattering vector s of 1.61±0.1 nm$^{-1}$ and 1.92±0.1 nm$^{-1}$ as illustrated in FIG. 1.

—Method for Confirming Presence of Cellulose Fiber—

The confirmation was performed by the wide-angle X-ray diffraction measurement using D8 DISCOVER (manufactured by Bruker AXS). The dumbbell test piece set in a state where the sample stage was inclined by θ=17.3° was irradiated with a CuKα ray by a pinhole collimator narrowed down to φ1.0 mm to obtain diffraction, and the obtained diffraction was detected by a two-dimensional detector VANTEC 500 (manufactured by Bruker AXS) set to a camera length of 10 cm, thus obtaining a two-dimensional diffraction image. An integral averaging process was performed to the obtained two-dimensional diffraction image in a range of the scattering vector s of 1.13 to 4.44 nm$^{-1}$ in an azimuthal direction of 0 to 90°, thus obtaining one-dimensional data. After a correction of subtracting air scattering according to a transmittance of the X-ray was performed to the one-dimensional data, a curve fitting was performed using a Gaussian function, thus separating diffraction components derived from polypropylene crystals and diffraction components derived from the cellulose fiber. When the diffraction peak was observed at a position of the scattering vector s of 3.86±0.1 nm$^{-1}$, it was determined that the cellulose fiber was present in the formed body. This is because the diffraction peak derived from the cellulose fiber (004) plane ordinarily appears in a range where the scattering vector s is 3.86±0.1 nm$^{-1}$.

Figure 2:
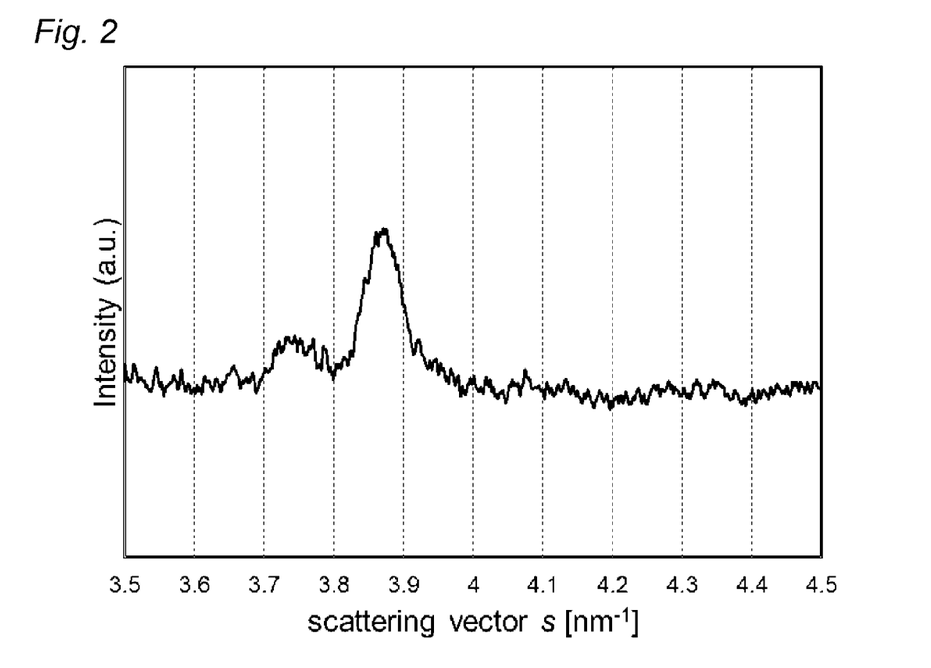
FIG. 2 is a one-dimensional diffraction pattern of a wide-angle X-ray diffraction measurement of the cellulose fiber-reinforced polypropylene resin formed body according to Example 1-1. A diffraction peak observed at a position of the scattering vector s of 3.87 nm$^{-1}$ is a diffraction peak derived from a cellulose fiber (004) plane.

In the table, the diffraction peak at the position of the scattering vector s of 3.86±0.1 nm$^{-1}$ is expressed as a "diffraction peak derived from cellulose fiber." For example, in the test piece of Example 1-1, as illustrated in FIG. 2, the diffraction peak at the position of the scattering vector s of 3.86±0.1 nm$^{-1}$ was confirmed.

—Method for Confirming Orientation Degree of Cellulose Fiber—

The orientation degree was determined using the data in a range of the azimuthal direction of 0 to 90° of the two-dimensional diffraction image derived from the cellulose fiber and obtained by the above-described method for confirming the presence of the cellulose fiber. An orientation function of the azimuthal direction was used for determining the orientation degree. Correction was performed using data of 33.6°±0.5° and 35.6°±0.5° close to a diffraction peak position of the cellulose as a base line of the diffraction. The orientation degree was obtained as an average value of results of the measurement at any given three points of a test piece that was adjusted to have the thickness of 0.5 to 1.5 mm and cut out from the dumbbell test piece.

TABLE 1

|  | Ex 1-1 | Ex 1-2 | Ex 1-3 | Ex 1-4 | CEx 1a | CEx 1b | CEx 1c | CEx 1d | REx |
|---|---|---|---|---|---|---|---|---|---|
| Polypropylene resin (mass parts) | 80 | 80 | 80 | 80 | 80 | 80 | 80 | 80 | 100 |
| Acid Modified Propylene Resin (mass parts) | — | — | — | — | — | — | — | — | — |
| Cellulose fiber 1 (mass parts) | 20 | 20 | 20 | 20 | 20 | 20 | 20 | 20 | — |
| Cellulose fiber 2 (mass parts) | — | — | — | — | — | — | — | — | — |
| Melting point Tm (° C.) | 165.4 | 165.9 | 166.1 | 166.1 | 167.2 | 168.1 | 167.8 | 167.5 | 167.0 |
| Crystallization temperature, Tc (° C.) | 122.2 | 124.7 | 125.8 | 125.6 | 129.9 | 130.2 | 130.0 | 129.9 | 128.5 |
| ΔT (° C.) | 43.2 | 41.2 | 40.3 | 40.5 | 37.3 | 37.9 | 37.8 | 37.6 | 38.5 |
| ΔTm (° C.) | 1.6 | 1.1 | 0.9 | 0.9 | −0.2 | −1.1 | −0.8 | −0.5 | — |
| ΔTc (° C.) | 6.3 | 3.8 | 2.7 | 2.9 | −1.4 | −1.7 | −1.5 | −1.4 | — |
| ΔTm < ΔTc | ○ | ○ | ○ | ○ | x | x | x | x | — |

TABLE 1-continued

|  | Ex 1-1 | Ex 1-2 | Ex 1-3 | Ex 1-4 | CEx 1a | CEx 1b | CEx 1c | CEx 1d | REx |
|---|---|---|---|---|---|---|---|---|---|
| Diffraction peak 1 derived from polypropylene | Observed | Observed | Observed | Observed | Observed | Observed | Observed | Observed | Observed |
| Diffraction peak 2 derived from polypropylene | Observed | Observed | Observed | Observed | Observed | Observed | Observed | Observed | Observed |
| Diffraction peak derived from cellulose fiber | Observed | Observed | Observed | Observed | Observed | Observed | Observed | Observed | Not observed |
| Orientation degree of the cellulose fiber | 0.22 | 0.28 | 0.21 | 0.22 | 0.13 | 0.15 | 0.19 | 0.18 | — |
| Elongation at break, 25° C. (%) | 9.8 | 6.5 | 5.9 | 5.5 | 4.6 | 4.3 | 4.5 | 5.0 | 18.9 |
| Elongation at break, 100° C. (%) | >700% | >700% | 510 | 500 | 420 | 400 | 380 | 350 | >700% |

Note:
"Ex" means Example, "CEx" means Comparative example, and "REx" means Reference example.

From the results in Table 1, the following can be found.

The resin formed bodies of Comparative Examples 1a to 1d have ΔT as a value obtained by deducting the crystallization temperature from the melting point of less than 40.0° C., and do not satisfy the relation of $\Delta T_m < \Delta T_c$ between the resin formed body and the polypropylene resin that constitutes the resin formed body. These resin formed bodies of Comparative Examples 1a to 1d each had low values of elongations at break at 25° C. and 100° C., and were poor. As indicated in the relation between these Comparative Examples 1a to 1d and Reference Example 1, the fiber-reinforced resin formed body is poor in elongation property compared with one without combined reinforcing fiber.

In contrast to this, the resin formed bodies in Examples 1-1 to 1-4 have the diffraction peaks at the positions of the scattering vector s of $1.61 \pm 0.1$ nm$^{-1}$, $1.92 \pm 0.1$ nm$^{-1}$, and $3.86 \pm 0.1$ nm$^{-1}$, have ΔT of 40.0° C. or more, and satisfy the relation of $\Delta T_m < \Delta T_c$ between the resin formed body and the polypropylene resin that constitutes the resin formed body. These resin formed bodies of Examples 1-1 to 1-4 had values of elongations at break at both temperatures of 25° C. and 100° C. that were high with respect to the values of the resin formed bodies of Comparative Examples 1a to 1d, and were found to enhance the elongation property at room temperature and at high temperature.

Example 2: Exemplary Combination Using Proportion of 80 Mass Parts of Polypropylene Resin and 20 Mass Parts of Cellulose Fiber Example 2

A dumbbell test piece was obtained in the same manner as Example 1-2 except that a combination of the polypropylene resin and the cellulose fiber was changed as shown in Table 2 in Example 1-2. The pressure during the extruding was indicated as 2.6 MPa by the pressure gauge installed in the C4 portion.

Comparative Example 2

A dumbbell test piece was obtained in the same manner as Example 2 except that the water was not combined in Example 2. The pressure during the extruding was indicated as 2.8 MPa by the pressure gauge installed in the C4 portion.

Using the dumbbell test pieces obtained in the above-described Example 2 and Comparative Example 2, measurements of tensile elongations at break, DSC measurements, and wide-angle X-ray diffraction measurements described in Example 1 were performed. The obtained results are shown in Table 2.

Note that, in calculations of $\Delta T_m$ and $\Delta T_c$, a melting point and a crystallization temperature of the sample for measurement from the dumbbell test piece of Reference Example 1 were used as $T_{m(PP)}$ and $T_{c(PP)}$, respectively, and a melting point and a crystallization temperature of the sample for measurement from the dumbbell test piece of Example 2 or Comparative Example 2 were used as $T_{m(PP\ Cell)}$ and $T_{c(PP\ Cell)}$, respectively.

TABLE 2

|  | Ex 2 | CEx 2 | REx 1 |
|---|---|---|---|
| Polypropylene resin (mass parts) | 90 | 90 | 100 |
| Acid Modified Propylene Resin (mass parts) | — | — | — |
| Cellulose fiber 1 (mass parts) | — | — | — |
| Cellulose fiber 2 (mass parts) | 10 | 10 | — |
| Melting point, Tm (° C.) | 167.5 | 168.0 | 167.0 |
| Crystallization temperature, Tc (° C.) | 125.8 | 130.1 | 128.5 |
| ΔT (° C.) | 41.7 | 37.9 | 38.5 |
| ΔTm (° C.) | −0.4 | −1.0 | — |
| ΔTc (° C.) | 2.7 | −1.6 | — |
| ΔTm < ΔTc | ○ | × | — |
| Diffraction peak 1 derived from polypropylene | Observed | Observed | Observed |
| Diffraction peak 2 derived from polypropylene | Observed | Observed | Observed |
| Diffraction peak derived from cellulose fiber | Observed | Observed | Not observed |
| Orientation degree of the cellulose fiber | 0.26 | 0.12 | — |
| Elongation at break, at 25° C. (%) | 13.7 | 10.7 | 18.9 |
| Elongation at break, at 100° C. (%) | >700% | 600 | >700 |

Note:
"Ex" means Example, "CEx" means Comparative example, and "REx" means Reference example.

From the results in Table 2, the following can be found.

The resin formed body of Comparative Example 2 has ΔT as a value obtained by deducting the crystallization temperature from the melting point of less than 40.0° C., and does not satisfy the relation of $\Delta T_m < \Delta T_c$ between the resin formed body and the polypropylene resin that constitutes the resin formed body. This resin formed body of Comparative Example 2 had each of low values of elongations at break at 25° C. and 100° C., and were poor.

In contrast to this, the resin formed body in Example 2 has the diffraction peaks at the positions of the scattering vector s of $1.61 \pm 0.1$ nm$^{-1}$, $1.92 \pm 0.1$ nm$^{-1}$, and $3.86 \pm 0.1$ nm$^{-1}$, has ΔT of 40.0° C. or more, and satisfies the relation of $\Delta T_m < \Delta T_c$ between the resin formed body and the polypropylene resin that constitutes the resin formed body. This resin formed body of Example 2 had values of elongations at break at both temperatures of 25° C. and 100° C. that were high with respect to the values of the resin formed body of Comparative Example 2, and was found to enhance the elongation property at room temperature and at high temperature.

Example 3: Exemplary Combination Using Proportion of 79 Mass Parts of Polypropylene Resin, 1 Mass Part of Acid Modified Propylene Resin, and 20 Mass Parts of Cellulose Fiber

Example 3

A dumbbell test piece was obtained in the same manner as Example 1-2 except that a combination of the polypropylene resin and the cellulose fiber was changed as shown in Table 3 in Example 1-2. The pressure during the extruding was indicated as 2.3 MPa by the pressure gauge installed in the C4 portion.

Comparative Example 3

A dumbbell test piece was obtained in the same manner as Example 3 except that the water was not combined in Example 3. The pressure during the extruding was indicated as 2.4 MPa by the pressure gauge installed in the C4 portion.

Reference Example 2

A dumbbell test piece was obtained in the same manner as Example 3 except that the cellulose fiber and the water was not combined in Example 3. The pressure during the extruding was indicated as 2.1 MPa by the pressure gauge installed in the C4 portion.

Using the dumbbell test pieces obtained in the above-described Example 3, Comparative Example 3, and Reference Example 3, measurements of tensile elongations at break, DSC measurements, and wide-angle X-ray diffraction measurements described in Example 1 were performed. The obtained results are shown in Table 3.

Note that, in calculations of $\Delta T_m$ and $\Delta T_c$, a melting point and a crystallization temperature of the sample for measurement from the dumbbell test piece of Reference Example 2 were used as $T_{m(PP)}$ and $T_{c(PP)}$, respectively, and a melting point and a crystallization temperature of the sample for measurement from the dumbbell test piece of Example 3 or Comparative Example 3 were used as $T_{m(PP\ Cell)}$ and $T_{c(PP\ Cell)}$, respectively.

TABLE 3

| | Ex 3 | CEx 3 | REx2 |
|---|---|---|---|
| Polypropylene resin (mass parts) | 79 | 79 | 98.75 |
| Acid Modified Propylene Resin (mass parts) | 1 | 1 | 1.25 |
| Cellulose fiber 1 (mass parts) | — | — | — |
| Cellulose fiber 2 (mass parts) | 20 | 20 | — |
| Melting point, Tm (° C.) | 166.1 | 167.7 | 166.5 |
| Crystallization temperature, Tc (° C.) | 125.7 | 128.8 | 127.5 |
| ΔT (° C.) | 40.4 | 39.0 | 39.0 |
| ΔTm (° C.) | 0.4 | −1.2 | — |
| ΔTc (° C.) | 1.8 | −1.3 | — |
| ΔTm < ΔTc | ○ | x | — |
| Diffraction peak 1 derived from polypropylene | Observed | Observed | Observed |
| Diffraction peak 2 derived from polypropylene | Observed | Observed | Observed |
| Diffraction peak derived from cellulose fiber | Observed | Observed | Not observed |
| Orientation degree of the cellulose fiber | 0.21 | 0.12 | — |
| Elongation at break, at 25° C. (%) | 6.9 | 4.6 | 5.1 |
| Elongation at break, at 25° C. (%) | >700% | 135 | >700% |

Note:
"Ex" means Example, "CEx" means Comparative example, and "REx" means Reference example.

From the results in Table 3, the following can be found.

The resin formed body of Comparative Example 3 has ΔT as a value obtained by deducting the crystallization temperature from the melting point of less than 40.0° C., and does not satisfy the relation of $\Delta T_m < \Delta T_c$ between the resin formed body and the polypropylene resin that constitutes the resin formed body. This resin formed body of Comparative Example 3 had each of low values of elongations at break at 25° C. and 100° C., and were poor.

In contrast to this, the resin formed body in Example 3 has the diffraction peaks at the positions of the scattering vector s of 1.61±0.1 nm$^{-1}$, 1.92±0.1 nm$^{-1}$, and 3.86±0.1 nm$^1$, has ΔT of 40.0° C. or more, and satisfies the relation of $\Delta T_m < \Delta T_c$ between the resin formed body and the polypropylene resin that constitutes the resin formed body. This resin formed body of Example 3 had values of elongations at break at both temperatures of 25° C. and 100° C. that were high with respect to the values of the resin formed body of Comparative Example 3, and was found to enhance the elongation property at room temperature and at high temperature.

Having described our invention as related to the embodiments and the examples, it is our intention that the invention not be limited by any of the details of the description, unless otherwise specified, but rather be construed broadly within its spirit and scope as set out in the accompanying claims.

This application claims priority on Patent Application No. 2019-060607 filed in Japan on Mar. 27, 2019, which is entirely herein incorporated by reference.

The invention claimed is:

1. A cellulose fiber-reinforced polypropylene resin formed body, wherein the cellulose fiber-reinforced polypropylene resin formed body has diffraction peaks observed at positions of a scattering vector s of 1.61±0.1 nm$^{-1}$, 1.92±0.1 nm$^{-1}$, and 3.86±0.1 nm$^{-1}$ in a wide-angle X-ray diffraction measurement, and has ΔT calculated by the following formula (1) of 40.0° C. or more;

$$\Delta T = T_{m(PP\ Cell)} - T_{c(PP\ Cell)} \quad (1)$$

wherein $T_{m(PP\ Cell)}$ and $T_{c(PP\ Cell)}$ indicate a melting point and a crystallization temperature, respectively, of the cellulose fiber-reinforced polypropylene resin formed body.

2. A cellulose fiber-reinforced polypropylene resin formed body, wherein the cellulose fiber-reinforced polypropylene resin formed body has diffraction peaks observed at positions of a scattering vector s of 1.61±0.1 nm$^{-1}$, 1.92±0.1 nm$^{-1}$, and 3.86±0.1 nm$^{-1}$ in a wide-angle X-ray diffraction measurement, and has $\Delta T_m$ and $\Delta T_c$ expressed by the following formulae (2) and (3) and satisfying $\Delta T_m < \Delta T_c$:

$$\Delta T_m = T_{m(PP)} - T_{m(PP\ Cell)} \quad (2)$$

$$\Delta T_c = T_{c(PP)} - T_{c(PP\ Cell)} \quad (3)$$

wherein $T_{m(PP)}$ indicates a melting point of polypropylene resin in the cellulose fiber-reinforced polypropylene resin formed body, $T_{m(PP\ Cell)}$ indicates a melting point of the cellulose fiber-reinforced polypropylene resin formed body, $T_{c(PP)}$ indicates a crystallization temperature of polypropylene resin in the cellulose fiber-reinforced polypropylene resin formed body, and $T_{c(PP\ Cell)}$ indicates a crystallization temperature of the cellulose fiber-reinforced polypropylene resin formed body.

3. The cellulose fiber-reinforced polypropylene resin formed body according to claim 1, wherein a component having the diffraction peak at the position of the scattering vector s of 3.86±0.1 nm$^{-1}$ has an orientation degree of more than 0.15 and less than 0.80.

4. The cellulose fiber-reinforced polypropylene resin formed body according to claim 2, wherein a component having the diffraction peak at the position of the scattering vector s of 3.86±0.1 nm$^{-1}$ has an orientation degree of more than 0.15 and less than 0.80.

5. The cellulose fiber-reinforced polypropylene resin formed body according to claim 1, wherein an elongation at break at 100° C. is more than 700%.

6. The cellulose fiber-reinforced polypropylene resin formed body according to claim 2, wherein an elongation at break at 100° C. is more than 700%.

7. A method for producing the cellulose fiber-reinforced polypropylene resin formed body according to claim 1,
wherein the method uses a twin-screw extruder,
wherein the twin-screw extruder includes screws having a compression structure with two or more stages that at least includes a first compression portion and a second compression portion,
wherein the method includes a step of adding water or maleic anhydride as a hydrophilic compound or a solution of the hydrophilic compound to a melt-kneaded product of a polypropylene resin and a cellulose fiber, at any positions from the first compression portion to the second compression portion of the screws, and conducting kneading under a pressure condition exceeding a saturated vapor pressure of the hydrophilic compound or solution of the hydrophilic compound.

8. A method for producing the cellulose fiber-reinforced polypropylene resin formed body according to claim 2,
wherein the method uses a twin-screw extruder,
wherein the twin-screw extruder includes screws having a compression structure with two or more stages that at least includes a first compression portion and a second compression portion,
wherein the method includes a step of adding water or maleic anhydride as a hydrophilic compound or a solution of the hydrophilic compound to a melt-kneaded product of a polypropylene resin and a cellulose fiber, at any positions from the first compression portion to the second compression portion of the screws, and conducting kneading under a pressure condition exceeding a saturated vapor pressure of the hydrophilic compound or solution of the hydrophilic compound.

* * * * *